United States Patent [15] 3,705,270
Huber [45] Dec. 5, 1972

[54] MOUNTING ARRANGEMENT FOR A MAGNETIC TAPE HEAD INCLUDING A SPHERICAL CAM FOLLOWER AND AN ARCUATELY SHAPED TAPE HEAD MOUNTING BRACKET

[72] Inventor: William B. Huber, Park Forest, Ill.

[73] Assignee: Motorola, Inc., Franklin Park, Ill.

[22] Filed: Jan. 21, 1971

[21] Appl. No.: 108,473

[52] U.S. Cl. ..........179/100.2 CA
[51] Int. Cl. ..........G11b 5/56, G11b 21/24
[58] Field of Search...179/100.2 CA; 274/4 A, 11 A

[56] References Cited

UNITED STATES PATENTS

| | | | |
|---|---|---|---|
| 3,440,359 | 4/1969 | Page et al. | 274/4 A |
| 3,575,422 | 4/1971 | Peltz et al. | 274/4 A |

*Primary Examiner*—Bernard Konick
*Assistant Examiner*—Robert S. Tupper
*Attorney*—Vincent Rauner and R. J. La Porte

[57] ABSTRACT

A mounting arrangement for the magnetic tape head in a tape player for playing multi-track tape cartridges comprises a mounting block movable along a vertical path in a plane adjacent the plane of the tape for positioning the tape head with respect to the tracks on the tape, and a collar receiving the tape head, connected to the block and rotatable with respect thereto for making an azimuth adjustment of the tape head with respect to the tape. A cam having a plurality of cam surfaces corresponding to different tracks on the tape is selectively coupled to the mounting arrangement through a cam follower mounted in engagement with a selected cam surface and the collar of the mounting arrangement. The cam follower includes a ball mounted in rolling engagement with a surface of the collar and the selected cam surface; the former being curved so that azimuth adjustments of the tape head do not affect the vertical positioning of the tape head along the path.

12 Claims, 3 Drawing Figures

PATENTED DEC 5 1972

3,705,270

INVENTOR
WILLIAM B. HUBER

BY Ronald J. La Porte
ATTORNEY.

MOUNTING ARRANGEMENT FOR A MAGNETIC TAPE HEAD INCLUDING A SPHERICAL CAM FOLLOWER AND AN ARCUATELY SHAPED TAPE HEAD MOUNTING BRACKET

BACKGROUND OF THE INVENTION

This invention relates generally to cartridge type tape players adapted to receive and play cartridges having multi-track tapes therein, and more particularly to apparatus for aligning the tape head of the player with the various tracks on the tape.

In cartridge type tape players capable of playing tape cartridges having multi-track tapes therein, it is necessary to align the tape head both in altitude and azimuth with respect to the tape, and to maintain this alignment as the head is repositioned during the operation of the player for playing the various tracks. If the tape head is not aligned properly with respect to the tape there is a good possibility that cross talk, loss of output and other undesirable effects will occur.

Prior art apparatus for adjusting the alignment of the tape head both with respect to altitude and azimuth, often suffers the drawback that when making an azimuth adjustment of the head with respect to the tape, the altitude adjustment is affected such that when the tape head is moved between tracks the head is aligned in azimuth but not in altitude. Conversely, when the head is adjusted in altitude the azimuth adjustment is disturbed.

SUMMARY OF THE INVENTION

Accordingly, it is a primary object of the present invention to provide a new and improved mounting arrangement for a tape head with which separate azimuth and altitude adjustments of the tape head with respect to the tape can be made without affecting each other.

It is another object of this invention to provide a tape head mounting arrangement of the above-described type which is relatively simple in construction and inexpensive to produce.

Briefly, a preferred embodiment of the tape head mounting arrangement according to the invention comprises a block member mounted for vertical movement in a plane adjacent a horizontally moving multi-track tape. A collar is mounted rotatably on the block member and receives a tape head for playing back the recorded tape. The tape head extends outwardly from the collar toward the plane of the tape and is rotatable about an axis perpendicular to the plane of the tape, to provide an azimuth adjustment of the head with respect to the tape, whereby the pickup portions of the tape head are aligned with corresponding tracks on the tape.

A cam having a plurality of different cam surfaces corresponding to different tracks on the tape is coupled to the tape head through a cam follower. The block member to which the collar is attached, is biased by a spring toward the cam follower. The selection of a cam surface moves the cam follower toward or away from the force of the biasing spring to adjust the altitude or vertical direction of the tape head with respect to the tape.

The cam follower comprises a sphere or ball member which engages the cam surface selected and a specially curved surface of the collar. The curvature of the collar surface is formed by an arc having a radius of a predetermined length taken from the center of rotation of the tape head. Thus, when the altitude of the tape head is adjusted, the collar may be rotated to change the azimuth of the tape head with respect to the tape without substantially altering the altitude setting. In addition, upon changing cam surfaces for the purpose of moving the tape head to different positions corresponding to the various tracks on the tape, no binding of the cam follower occurs since the ball is free rolling in the aperture in which it is mounted.

DETAILED DESCRIPTION

Figure 1:
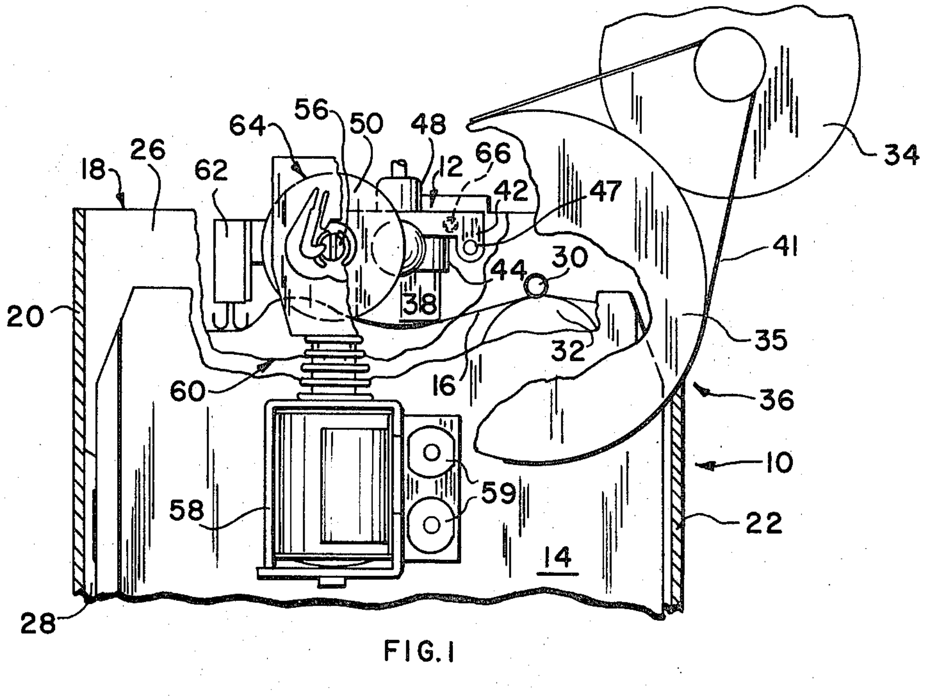
FIG. 1 is a top, sectional, plan view of a tape player incorporating a mounting arrangement for the magnetic tape head used therein according to the invention.

Referring now to the drawing in greater detail wherein like numerals have been employed to designate similar parts throughout the various views, FIG. 1 thereof illustrates a cartridge type tape player 10 in which a magnetic tape head mounting arrangement 12 according to the invention is employed.

The tape player 10 is adapted to receive and play a tape cartridge 14 having a recorded multi-track tape 16 mounted therein. The tape player 10 includes a chassis 18 including a pair of side walls 20, 22 interconnected by top and bottom walls or plates, 24, 26, respectively, to form a cartridge receiving tunnel or cavity 28.

Mounted on chassis 18, in communication with tunnel 28, is a capstan shaft 30 against which a pressure roller 32 in the tape cartridge is pressed upon insertion of the cartridge into tunnel 28. The capstan shaft is driven in the usual manner by a motor 34 and pulley arrangement 36 including flywheel 35 and belt 41, to move the tape 16 sandwiched between the capstan shaft and the pressure roller, through the cartridge and past the magnetic tape head 38 mounted on the chassis by means of the magnetic tape head mounting arrangement 12 according to the invention.

Figure 2:
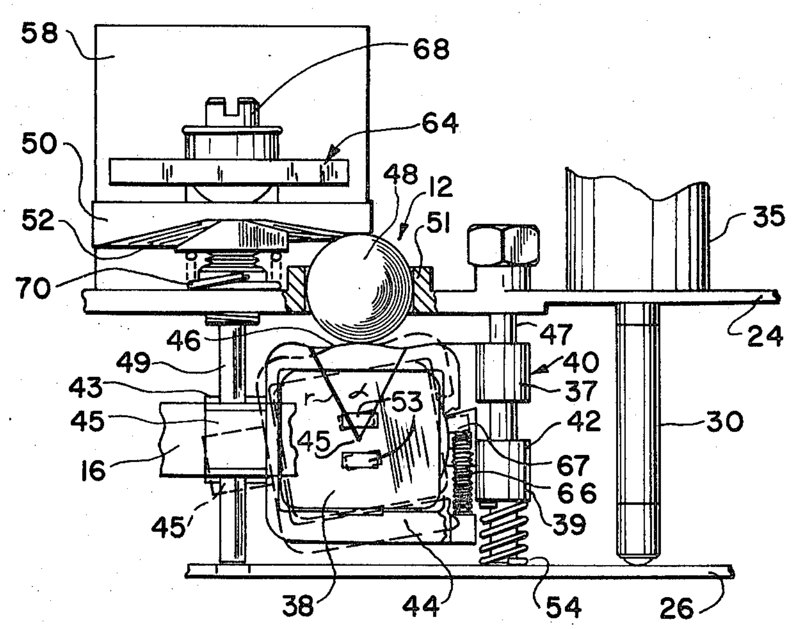
FIG. 2 is an enlarged, sectional front view of the magnetic tape head mounting arrangement of the invention illustrating the relation of the various elements thereof when making an azimuth adjustment of the tape head with respect to the magnetic tape.

The mounting arrangement 12 is designed to move the tape head in a plane adjacent the tape 16 in a direction transverse the movement of the tape for selectively positioning the tape head to align the magnetic pickups 39 (FIG. 2) thereof with certain ones of the various tracks on the tape. As illustrated in FIG. 2 of the drawings, in the particular embodiment of the tape player described herein, the tape 16 moves horizontally through the cartridge 14 and the tape head is mounted for vertical movement.

Figure 3:
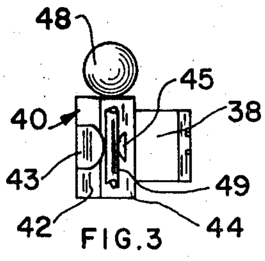
FIG. 3 is a side view of the support bracket on which the magnetic tape head of the player of FIG. 1 is mounted for movement, illustrating the two interconnecting portions of the bracket in more detail.

The mounting arrangement for magnetic tape head 38 includes a support bracket assembly 40 comprising first and second interconnected block and collar portions, 42, 44, respectively, best seen in FIG. 3. Block 42 is mounted for sliding movement by means of apertured arms 37, 39, on vertical pin 47 extending between the top and bottom walls 24, 26, of chassis 18. Collar 44 is connected to block 42 and is rotatable with respect thereto. Both block 42 and collar 44 include also aligned arm members 43, 45, respectively, located on opposite sides of pin 49 for guiding the vertical movement of bracket assembly 40. Tape head 38 is mounted on collar 44 and extends outwardly therefrom in a direction substantially perpendicular to the plane of tape 16. Tape head 38 is rotatable with collar 44 for the purpose of making an azimuth adjustment of the tape head with respect to tape 16, thereby to position the magnetic pickups 53 of the tape head in parallel alignment with respect to the different tracks on the tape.

Collar 44 includes an upper, horizontally extending surface 46 with which a cam follower 48 is in engagement to transmit force from a cam 50 having a plurality of cam surfaces 52, each selectively engageable with the cam follower. The cam follower according to the invention, takes the form of a spherical ball member, mounted loosely in an aperture 51 in upper wall 24 of the tape player chassis (FIG. 2). The surface 46 of collar 44, with which ball 48 is in rolling engagement, is specially curved (see FIG. 2). The curvature of surface 46 is defined by an arc formed by a radius $r$ of a predetermined length extending from the center of rotation 45 of collar 44. It will be apparent to one skilled in the art that the actual length of radius $r$ is determined by the size of tape head 38 and collar 44.

The arc formed extends only over an $\alpha$ of approximately 30°, but could be continued if desired. In the embodiment shown, the end portions of surface 46 are curved upwardly for manufacturing purposes.

A coil spring 54 mounted on pin 47 between arm 39 of block 42 and the lower wall 26 of chassis 18, provides a biasing force against the block 42 to maintain the cam follower 48 in contacting relation with cam 50 at all times.

Cam 50 is mounted for rotation on a central shaft 56 extending vertically from upper wall 24 of the chassis. Upon rotation of the cam, the ball bearing 48 moves the support bracket assembly 40, and thus the tape head 38, toward or away from the spring bias depending upon the cam surface 52 selected, to position the magnetic tape head vertically as shown in the drawings, to a different set of tracks on the tape.

Upon completion of the playing of one set of tracks on the multi-track tape 16, a solenoid 58, mounted by fasteners 59 on the upper wall 24 of chassis 18, is actuated to operate a linkage 60 for rotating the cam 50, thereby to position the tape head to a new set of tracks on the magnetic tape 16. The solenoid is operated in response to the detection by contact set 62, mounted on bottom wall 26, of a conductive strip (not shown) on tape 16. The linkage 60, shown in the drawings of the present application, is a double pawl and ratchet arrangement 64 which is described in greater detail in copending patent application, Ser. No. 834,076, and now U.S. Pat. No. 3,636,782, filed June 17, 1969, and assigned to the same assignee as the instant application. It should be noted, however, that other suitable cam driving arrangements may be used with equally good success.

At some time during the use of the tape player 10, it will become necessary to make an azimuth adjustment of the tape head; i.e. to move the magnetic pickups 53 into parallel alignment with respect to the different tracks on the tape 16, to avoid crossover and other undesirable sound effects. As stated heretofore, collar 44 upon which tape head 38 is mounted, is rotatable with respect to vertically movable block 42. Rotational adjustment of the tape head is accomplished by means of set screw 66 (FIG. 2) mounted in block 42 and engageable with nib 67 of collar 44.

Because of the provision of ball 48 and mating arcuate collar surface 46, any rotational adjustment of collar 44 with respect to block 42 does not disturb the vertical or altitude positioning of the tape head. The latter can be seen readily in FIG. 2 of the drawings wherein the tape head is shown in solid and dotted lines, respectively, in two azimuth settings. As collar 44 and tape head 38 are rotated with respect to block 42, the ball 48 rolls along surface 46. The height or vertical positioning of the block 42 is not disturbed. This is illustrated in FIG. 2 by the fact that substantially no movement of block 42 along pin 47 is evident.

Vertical adjustment of the tape head can be made also by tightening or loosening a screw 68 (FIG. 2). The rotation of the screw adjusts the vertical location of cam 50 against the force of coil spring 70 provided between cam 50 and upper wall 24 of chassis 18. The adjustment of cam 50 moves ball 48 toward or away from collar surface 46, depending on the adjustment of screw 68, to reposition the block 42 along pins 47, 49. The vertical adjustment of tape head 38 likewise can be made without disturbing the azimuth adjustment of the tape head with respect to tape 16.

In addition to permitting an azimuth adjustment of the tape head without altering the vertical position thereof with respect to tape 16, the ball cam follower 48, prevents binding during normal usage of the player, i.e. when moving the tape head vertically in accordance with the selection of different cam surfaces 52. This is due to the fact that ball 48 rolls freely in aperture 51 as cam surfaces 52 are changed with respect to the ball.

Thus, the mounting arrangement 12 including ball 48 and support bracket assembly 40 as described, provides an efficient and effective means to mount a magnetic tape head in a multi-channel tape player so that both altitude and azimuth adjustments of the tape head may be made without disturbing the other.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. A mounting arrangement for a magnetic tape head having magnetic pick-up means, movable to cooperate with the different tracks of a recorded multi-track magnetic tape for reproducing the same, said mounting arrangement including a bracket member mounted for movement parallel to the plane of the magnetic tape, transverse the direction of movement of the latter, and receiving said tape head, said bracket member also being rotatable about an axis extending perpendicular to the plane of said tape and centrally located relative to said magnetic pick-up means for adjusting the azimuth of said tape head with respect to said magnetic tape, an outer surface of said bracket member being arcuately shaped along a predetermined portion thereof, said surface portion being defined by an arc struck by the movement of a radius of a predetermined length extending from the axis of rotation of said bracket member, cam means including a plurality of different cam surfaces, each surface associated with a different track on the tape, and a cam follower interposed between and selectively contacting one of said cam surfaces and said outer arcuate surface of said bracket member, respectively, for positioning the tape head with respect to said tape, said cam follower including a force transmitting member, said last-mentioned member being in engagement with the outer surface portion of said bracket member, whereby upon moving said bracket member rotatably for making an azimuth adjustment, the position of said tape head in said plane parallel to the tape and transverse the direction of movement thereof is substantially maintained.

2. A mounting arrangement as claimed in claim 1 further including a second bracket member and guide means, said second bracket member being mounted on said guide means for movement only transverse the direction of movement of said tape, said first-mentioned bracket member being mounted on said second bracket member for movement therewith and rotatable with respect to said second bracket member about said predetermined axis of rotation.

3. A mounting arrangement as claimed in claim 1 wherein said magnetic pick-up means include a pair of magnetic pick-ups spaced from each other in the direction of movement of said bracket member, and wherein said axis of rotation of said first-mentioned bracket member extends between said magnetic pick-ups equi-distant from each one of said pair thereof.

4. A mounting arrangement for a magnetic tape head having magnetic pick-up means, movable to cooperate with the different tracks of a recorded multi-track magnetic tape for reproducing the same, said mounting arrangement comprising: bracket means for receiving said tape head, means for moving said bracket means along a predetermined path in a plane adjacent and parallel to said tape and in a direction transverse the direction of movement of said tape, said bracket means also being rotatable about an axis substantially perpendicular to said tape and centrally located with respect to said magnetic pick-up means to provide azimuth adjustment of the magnetic tape head with respect to said tape, force transmitting means interposed between said moving means and said bracket means for directing the force provided by said moving means toward said bracket means to move said tape head to a plurality of locations along said path thereby to position said magnetic pick-up means with respect to the various recording tracks thereon, said force transmitting means including a spherical member mounted in rolling engagement with said moving means and a predetermined surface of said bracket means, said predetermined surface of said bracket means being curved outwardly, the curvature of said surface being defined by an arc struck by a radius of a predetermined length extending from the axis of rotation of said bracket means, said spherical member being mounted in contacting relation with said curved surface so that upon moving said bracket means rotatably for the purpose of providing an azimuth adjustment of said tape head with respect to said tape, the positioning of said tape head along said path with respect to said tape is substantially maintained.

5. A mounting arrangement as claimed in claim 4 wherein the direction of movement of said tape is substantially horizontal, wherein said bracket means is movable in a substantially vertical direction and wherein said mounting arrangement includes biasing means for biasing said bracket means into engagement with said force transmitting means.

6. In a tape player adapted to receive and play a tape cartridge having a recorded multi-track tape therein positioned to be engaged to drive the tape through the cartridge, a magnetic tape head having magnetic pick-up means, tape driving means for contacting the tape and driving the same through the cartridge and past said magnetic tape head in contacting relation with said magnetic pick-up means, mounting means for said tape head including a mounting bracket receiving said tape head and being movable in a plane parallel to the plane of said tape in a direction transverse the direction of movement of the latter for making an altitude adjustment of the tape head to position said magnetic pick-up means with respect to the different tracks on said tape, said bracket also being rotatable about an axis perpendicular to the plane of said tape and extending through said tape head centrally relative to said magnetic pick-up means for making an azimuth adjustment of said tape head with respect to said tape, a predetermined outer surface of said bracket being arcuately shaped along a portion thereof, said portion being defined by an arc struck by the movement of a radius of a predetermined length extending from the axis of rotation of said bracket, cam means including a plurality of different cam surfaces, each surface associated with a different track on said tape, a cam follower interposed between said cam surfaces and the arcuate surface portion of said bracket for positioning the tape head with respect to the various tracks on said tape and means resiliently biasing said bracket toward said cam follower, whereby the selection of one said cam surface moves the cam follower toward or away from the biasing force to adjust the altitude of the tape head with respect to the tape, and upon rotation of said bracket for the purpose of making an azimuth adjustment of the tape head with respect to said tape, the altitude adjustment of said tape head remains substantially unchanged.

7. A tape player as claimed in claim 6 wherein said cam follower includes a spherical member mounted in rolling engagement with said predetermined surface of said bracket.

8. A tape player as claimed in claim 7 wherein said bracket includes a block member mounted for movement only in a plane parallel to said tape in a direction transverse the direction of movement of the tape, and a collar member rotatably mounted about said axis extending perpendicular to said tape on said block member and receiving said tape head, said predetermined, arcuately shaped bracket surface being formed on said collar member and wherein said spherical member is mounted in engagement with said predetermined surface on said collar member.

9. In a tape player adapted to receive and play a tape cartridge having a recorded multi-track tape therein positioned to be engaged to drive the tape through the cartridge, a magnetic tape head having magnetic pick-up means, tape driving means for engaging the tape and driving the same through the cartridge and past said magnetic tape head, support means for holding said tape head mounted for movement along a path transverse the direction of movement of said tape and in a plane parallel to and adjacent said tape; said support means being rotatable about a predetermined axis extending perpendicular to the plane of said tape and centrally located relative to said magnetic pick-up means for making an azimuth adjustment of said tape head with respect to said tape, a predetermined surface of said support means being arcuately shaped, the curvature thereof being defined by an arc struck by the movement of a radius of a predetermined length extending from the axis of rotation of said support means, drive means providing a force for moving the support means including said tape head to a plurality of positions along said path for aligning the magnetic pick-up means of said tape head with corresponding tracks on said tape, and a ball interposed between said support means and said drive means and being in engagement with said predetermined surface of said support means for transmitting the force provided by said drive means to said support means thereby to move the latter along said path, and permitting rotational movement of said support means about said predetermined axis for making an azimuth adjustment of said tape head with respect to said tape while maintaining substantially the position of said tape head along said path.

10. A tape player as claimed in claim 9 wherein said support means comprise a first member mounted for movement along said path and a second member attached to said first member and rotatable with respect thereto about said predetermined axis, receiving said tape head, said second member including said predetermined arcuate surface.

11. A mounting arrangement for a magnetic tape head having magnetic pick-up means, movable to cooperate with the different tracks of a recorded multi-track magnetic tape for reproducing the same, said mounting arrangement comprising: bracket means for receiving said tape head, means for moving said bracket means along a predetermined path in a plane adjacent and parallel to said tape and in a direction transverse the direction of movement of the tape, said bracket means also being rotatable about an axis extending substantially perpendicular to the plane of said tape and centrally located relative to said magnetic pick-up means to provide azimuth adjustment of the magnetic tape head with respect to said tape, a predetermined outer surface portion of said bracket means being arcuately shaped and being defined by an arc struck by the movement of a radius of a predetermined length extending from the axis of rotation of said bracket means, force transmitting means interposed between said moving means and said bracket means for directing the force provided by said moving means toward said bracket means to position said tape head to a plurality of locations along said path with respect to said tape corresponding to the various tracks thereon, said force transmitting means including a member having a relatively convex surface mounted in engagement with said predetermined outer surface portion of said bracket means, so that upon rotating said bracket means for the purpose of providing an azimuth adjustment of said tape head with respect to said tape, the positioning of said tape head along said path is substantially maintained.

12. A mounting arrangement as claimed in claim 11 wherein said force transmitting means member comprises a ball bearing.

* * * * *